United States Patent [19]

Rhodes

[11] Patent Number: 5,031,862
[45] Date of Patent: Jul. 16, 1991

[54] AIRCRAFT WITH PASSENGER SAFETY NET

[76] Inventor: James R. Rhodes, V.A. Hospital, Building E-15, Asheville, N.C. 28805

[21] Appl. No.: 470,780

[22] Filed: Jan. 26, 1990

[51] Int. Cl.⁵ .................. B64C 1/00; B64D 25/00; B64D 25/02
[52] U.S. Cl. .................. 244/121; 244/117 R; 244/119
[58] Field of Search .......... 244/121, 118.5, 117 R, 244/119, 118.1

[56] References Cited

U.S. PATENT DOCUMENTS

| | | |
|---|---|---|
| 2,715,001 | 8/1955 | Provenzano . |
| 2,949,841 | 8/1960 | Richardson . |
| 4,073,452 | 2/1978 | Gosau ..................... 244/121 X |
| 4,089,140 | 5/1978 | McIntyre et al. ............ 244/121 X |
| 4,121,790 | 10/1978 | Graham . |
| 4,389,030 | 6/1983 | San Miguel . |
| 4,678,226 | 7/1987 | Ishizuka et al. . |
| 4,728,059 | 3/1988 | Stephen et al. ............. 244/121 X |

FOREIGN PATENT DOCUMENTS 581142 10/1946 United Kingdom ............ 244/119

Primary Examiner—Margaret A. Focarino
Assistant Examiner—James M. Kannofsky
Attorney, Agent, or Firm—David M. Carter

[57] ABSTRACT

There is provided a passenger carrying aircraft having a cabin and outer walls. The aircraft includes a safety net located between the cabin and the outer walls. The safety net covers substantially the entire fuselage. If a part of the outer walls fails while the cabin is pressurized and detaches from the fuselage, the safety net will restrain the passengers from being sucked out of the cabin.

9 Claims, 2 Drawing Sheets

U.S. Patent July 16, 1991 Sheet 2 of 2 5,031,862 ered, the diameter of the strands and the size of the openings in the net are such as to minimize the injury to the passenger.

AIRCRAFT WITH PASSENGER SAFETY NET

BACKGROUND OF THE INVENTION

This invention relates to aircraft passenger safety. More particularly, it relates to apparatus for preventing the ejection of passengers from the cabin of an aircraft which has undergone cabin wall failure at high altitude.

When a passenger aircraft is flown at high altitudes, it is necessary to pressurize the cabin with air to provide a suitable environment for the passengers. It has been found that an aircraft which has undergone a large number of pressurization cycles will begin to show signs of fatigue on its outer walls, for example rivets have become loosened. Also if there is an explosion or other sudden increase in pressure within the aircraft, a portion of the outer wall may fail. Furthermore, if the aircraft is hit by a projectile such as a missile, outer wall failure may also occur. These situations have resulted in the removal of a portion of the outer wall, exposing the cabin passengers directly to the low pressure on the outside of the aircraft. An example of outer wall failure is shown in FIG. 1. This sudden failure of the outer wall and sudden depressurization of the cabin results in a rapid movement of cabin air to the outside of the aircraft which can be sufficient to physically suck passengers out of the aircraft.

OBJECTS OF THE INVENTION

It is therefore one object of this invention to provide a means for preventing the loss of passengers from a cabin of an aircraft which is flying at high altitude and which undergoes outer wall failure.

It is another object to provide a means for preventing passengers from being removed from the cabin of an aircraft through a hole in the outer wall which does not add significant weight to the aircraft.

It is another object to provide a means for retaining passengers in an aircraft which has lost part of its outer wall without causing undue injury to the passengers.

It is still another object to provide a means for retaining passengers in an aircraft which has undergone outer wall failure using commercially available materials which are inexpensive and easy to install.

SUMMARY OF THE INVENTION

In accordance with one form of this invention there is provided an aircraft having a fuselage which has an outer wall. A cabin is provided in the aircraft for housing passengers. The outer wall is subject to high air pressure differentials on opposing sides when the aircraft is at high altitude. An open mesh net is located between at least portions of the outer wall and the cabin for retaining passengers inside of the cabin in the event of structural failure of the outer wall when the aircraft is at high altitude. It is preferred that the net cover substantially the entire fuselage and be connected to the ribs of the aircraft. It is also preferred that the net be constructed of nylon which may have a soft outer layer of a material which will lessen the risk of injury to the passenger. The net should be made of light material so as not to add significant weight to the aircraft.

BRIEF DESCRIPTION OF THE DRAWINGS

The subject matter which is regarded as the invention is set in the appended claims. The invention itself however together with further objects and advantages thereof may be better understood by reference to the following description taken in conjunction with the accompanying drawings in which:

DESCRIPTION OF THE PREFERRED EMBODIMENT

Figure 3:
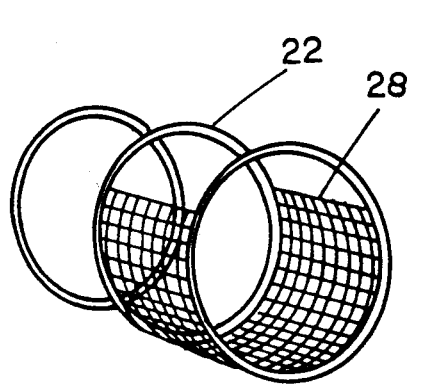
FIG. 3 is a plan view showing a part of the rib support structure of the aircraft of FIG. 2 incorporating the subject invention but, for simplicity's sake, showing the net covering only a portion of the rib support.
Figure 4:
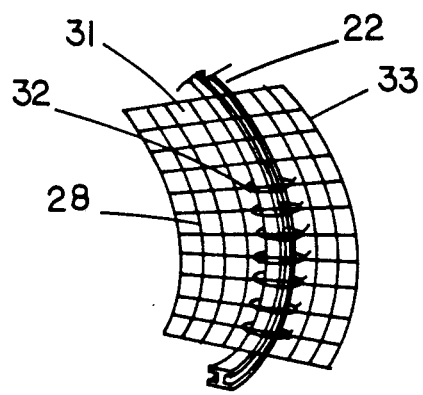
FIG. 4 is an enlarged view of a portion of the rib structure of FIG. 3.
Figure 5:
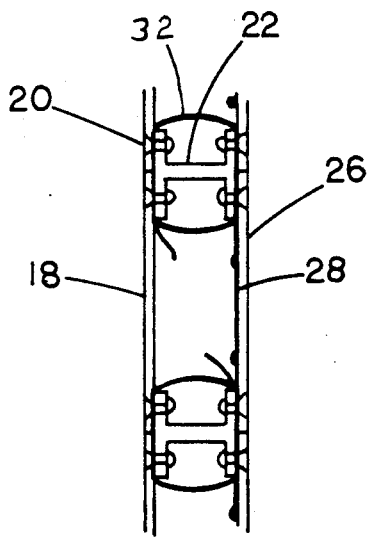
FIG. 5 is a partial sectional top view of one wall of the aircraft of FIG. 2 taken through line A—A.
Figure 6:
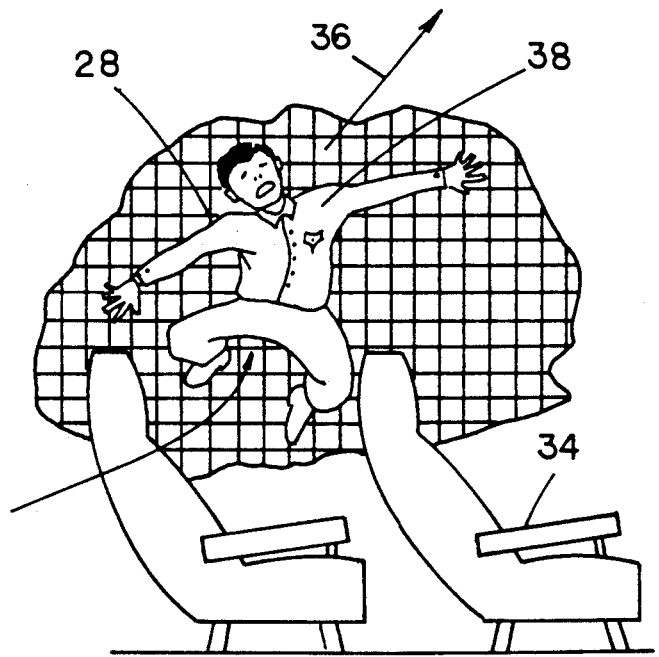
FIG. 6 shows a partial pictorial view showing a passenger in the cabin of an aircraft which has undergone outer wall failure incorporating the subject invention.

Referring now more particularly to FIGS. 2 through 7, there is provided aircraft 10 having fuselage 12 and wings 14. Fuselage 12 includes outer wall 16 constructed of a plurality of aluminum sheets 18. The aluminum sheets are fixed to ribs 22 by rivets 20 as shown in FIG. 5.

The fuselage 12 includes passenger compartment or cabin 24. Panels 26 form the inside wall covering of cabin 24 and are affixed to ribs 22. Open mesh net 28 is received between outer wall 16 and panels 26 preferably throughout the entire fuselage. For clarity, the net 28 is shown in FIG. 3 to cover only a portion of ribs 22, however it is preferred that the net completely cover all of the ribs. Holes may be cut in certain places in the net so as not to cover windows 30. Net 28 is attached to ribs 22 by means of cable ties 32 as shown in FIG. 4. The diameter of the strands of the net and the width and height of the openings 31 in the net will determine the weight. The diameter of the strands 33 should be as small as possible without reducing the strength to the point of failure of the net and the width and height of the open mesh 31 should be such so as to prevent a small passenger, e.g. a baby, from passing therethrough.

Preferably the net 28 is made of strong lightweight nylon with each strand having a diameter of approximately 0.25 inches. Preferably the width and height of each mesh opening 31 in the net is approximately 1.0 inches on center.

Figure 1:
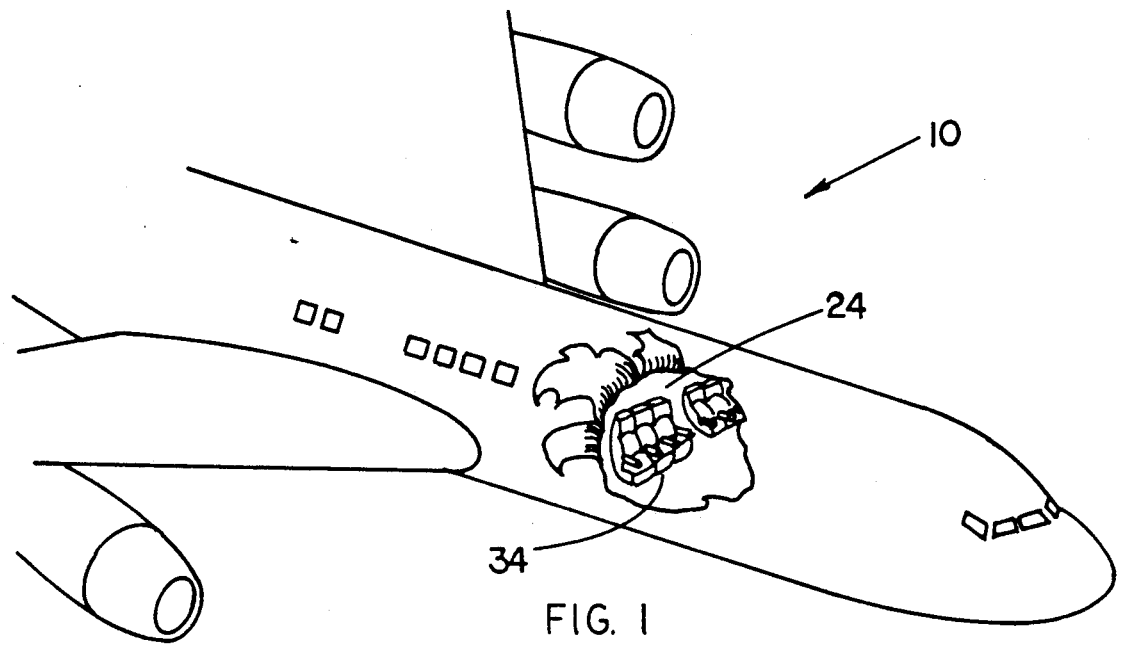
FIG. 1 is a partial plan view showing a prior art aircraft which has undergone outer wall failure.
Figure 2:
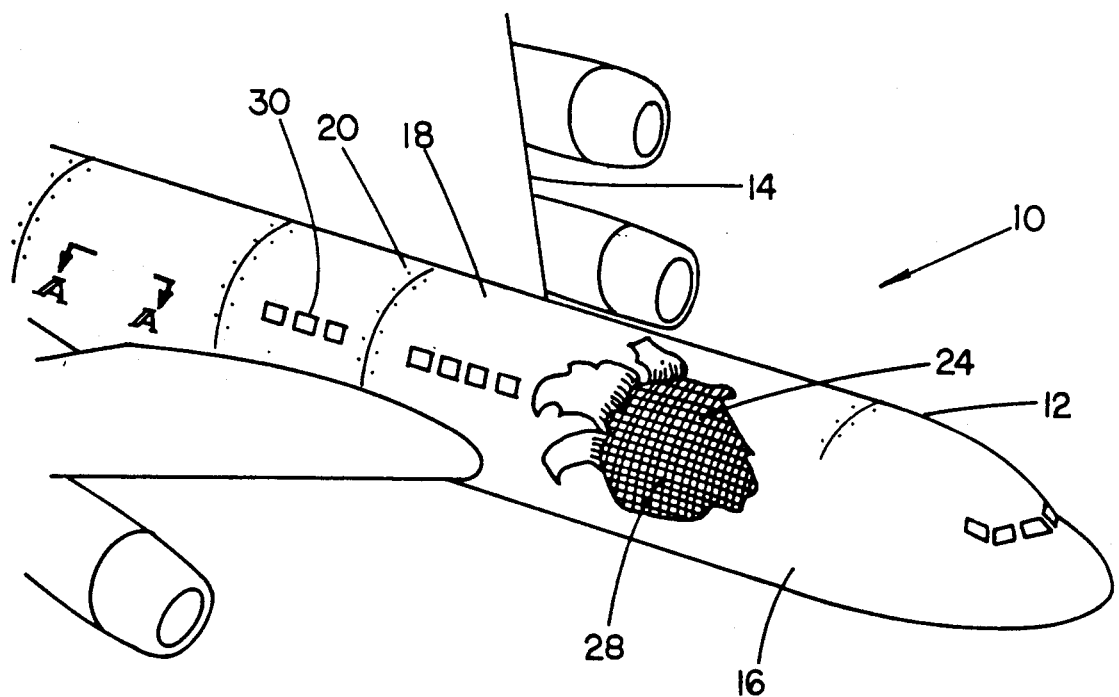
FIG. 2 is a partial plan view of the aircraft of FIG. 1 but incorporating the subject invention.

When aircraft 10, which has been pressurized and is flying at high altitude, experiences outer wall failure because of, for example, metal fatigue or rivets coming loose, or because the plane is hit by a projectile or an explosion occurs on the plane, and if a portion of the outer wall 16 is removed as shown in FIGS. 1 and 2, the passengers sitting in seats 34 will be directly exposed to the outside of the airplane. There will be a sudden decompression of the cabin 24 resulting in very high forces and may result in passengers being literally sucked out of the cabin. However, with net 28 in place all around the fuselage, the compressed air in the cabin will pass directly through the open mesh net to the outside of the airplane as indicated by arrows 36 in FIG. 6. However, passenger 38 will be thrown up against the net 28 and will not be pulled outside of the cabin. Furthermore, since the net is tied to the ribs of the airplane, the net itself will not be sucked out of the cabin. Thus an important safety feature has been provided for aircraft using existing inexpensive materials which are easy to install and do not greatly increase the weight of the aircraft.

Figure 7:
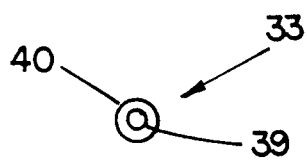
FIG. 7 is a sectional view of a portion of one strand of the net which may be used in connection with the subject invention.

Preferably the netting is made of nylon strands 39, however an outer coating could be added over the nylon such as felt coating 40 shown in FIG. 7 so as to reduce the risk of injury to passenger 38 when he is pulled up against the net 28.

The instant invention has utility both for commercial airliners and military transports.

From the foregoing description of the preferred embodiment of the invention, it will be apparent that many modifications may be made therein. It is understood that this embodiment of the invention is intended as an exemplification of the invention only and that this invention is not limited to thereto. It is to be understood therefore that it is intended in the appended claims to cover all such modifications as fall within the true spirit and scope of the invention.

I claim:

1. An aircraft comprising:
   a fuselage; said fuselage including an outer wall;
   a cabin housing passengers; said outer wall being subject to high air pressure differentials on opposing sides;
   a open mesh net located between at least portions of said outer wall and said cabin for retaining passengers inside of said cabin in the event of structural failure of said outer wall when said aircraft is at high altitude; said net being made of nylon.

2. An aircraft as set forth in claim 1 further including a plurality of support ribs; said outer wall and said net connected to said support ribs.

3. An aircraft as set forth in claim 2 further including a plurality of cable ties connecting said net to said ribs.

4. An aircraft as set forth in claim 1 wherein said net covers substantially the entire fuselage of said aircraft.

5. An aircraft as set forth in claim 1 further including paneling on the inside of said aircraft; said net being located between said paneling and said outer wall.

6. An aircraft as set forth in claim 1 wherein said mesh of said net is 1.0 inches in width and 1.0 inches in height.

7. An aircraft as set forth in claim 1 further including a soft outer layer of material covering said nylon.

8. An aircraft as set forth in claim 7 wherein said soft outer layer is felt.

9. An aircraft as set forth in claim 1 wherein said net is made of a plurality of strands; said strands being 0.25 inch in diameter.

* * * * *